April 3, 1934.   G. H. B. WEST   1,953,577
GREASE RETAINING SEAL NUT FOR STORAGE BATTERIES
Filed Sept. 24, 1931
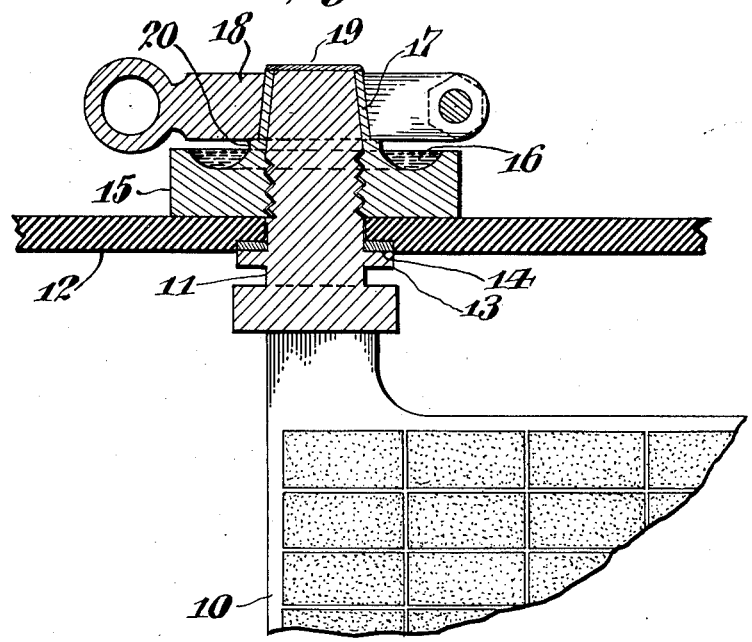
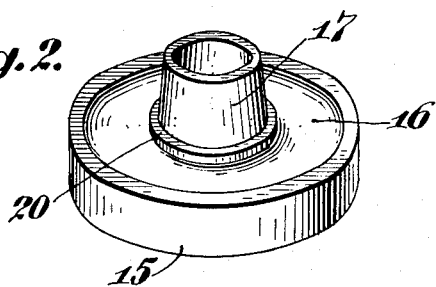
Inventor
George H. B. West,
By Augustus B. Stoughton
Attorney Patented Apr. 3, 1934

1,953,577

UNITED STATES PATENT OFFICE 1,953,577

GREASE RETAINING SEAL NUT FOR STORAGE BATTERIES

George H. B. West, Philadelphia, Pa., assignor to The Electric Storage Battery Company, Philadelphia, Pa., a corporation of New Jersey Application September 24, 1931, Serial No. 564,741

2 Claims. (Cl. 173—259)

The object of my invention is to prevent the corrosion which occurs at the terminals of storage batteries due to the creepage of the electrolyte into the space between the terminal post and the terminal connector of the battery. For this purpose I provide a seal nut of special construction having a grease-retaining cavity surrounding that portion of the terminal post to which the connector is attached and having a conical projection suitable for burning to the terminal post. There is thus provided in one direction a solid metal connection and in the other direction a ring of grease which prevent the creepage of electrolyte into the space between the terminal post and the connector.

For a further exposition of my invention reference may be had to the annexed drawing and specification at the end whereof my invention will be specifically pointed out and claimed.

In the drawing,

Figure 1 is a vertical cross section through my device showing the adjacent parts.

Figure 2 is a view in projection showing my improved seal nut.

In the embodiment of my invention chosen for illustration in the drawing, there are disclosed parts of a storage battery consisting of a plate generally indicated at 10 having a terminal post generally indicated at 11 thereon. The terminal post projects through an orifice in the cell cover 12 and has a collar 13 which bears against a gasket 14 of soft rubber or suitable acid resisting metal or alloy. Above cell cover 12 and about terminal post 11 there is provided a seal nut 15 which may conveniently be provided with screw threaded engagement with the terminal post 11. Seal nut 15 has on its upper surface a cavity or groove 16 conveniently of annular shape surrounding the terminal post 11. Groove 16 contains grease or other suitable substance 50 for preventing the creepage of acid. Seal nut 15 is also provided on its upper face within cavity 16 with an extension 17 conveniently of frusto-conical shape having opened ends through or into which terminal post 11 passes. The extension 17 thus forms a thin element surrounding the upper part of terminal post 11 and may conveniently be tapered on its outer surface to receive a connector 18. Extension 17 is lead burned, soldered or otherwise made integral or fastened to terminal post 11 as indicated at 19. Seal nut 15 is also provided on its upper surface between cavity 16 and extension 17 with a spacing collar 20 which serves to locate the connector 18 away from the upper surface of the seal nut 15 and from the cavity 16 and to thereby prevent the creepage of acid from the upper surface of cover 12 to connector 18.

In assembling a storage battery according to my invention a seal nut 15 is placed about a terminal post 11 and lead burned or fastened thereto in any convenient manner. Grease or any other suitable substance which prevents the creepage of acid is then placed in cavity 16. It will thus be seen that the creepage of acid to reach that portion of the outer surface of extension 17, to which the connector 18 is to be applied, is prevented by the solid connection 19 between the terminal post 11 and the extension 17 in one direction and by the annular ring of grease or other material in the other direction. Corrosion between the terminal and the connector is therefore prevented.

I do not intend to be limited in the practice of my invention save as the scope of the prior art and of the attached claims may require.

I claim:

1. Means for preventing the creepage of corrosion to the space between a terminal clamp and a storage battery terminal post, said means including in combination a terminal post, a seal nut surrounding said terminal post and having screw threaded engagement with an intermediate part of said post, an extension on said seal nut surrounding the upper end of said terminal post, an integral connection between the top of said extension and the top of said terminal post, said seal nut having an open faced cavity in its upper surface surrounding said extension and adapted to retain grease therein, a terminal clamp fastened to said extension between said integral connection between said extension and said post and said cavity and overlying said cavity, a spacing collar on said seal nut whereby said terminal clamp is vertically spaced from said cavity, and grease in said cavity.

2. A seal nut for storage batteries having a screw threaded opening therein and having an integral spacing collar thereon surrounding said opening and having an integral extension thereon of the form of a hollow truncated cone mounted on said collar and said seal nut having an annular cavity in its top surface surrounding said collar and adapted to contain grease.

GEORGE H. B. WEST.